United States Patent
Tomita et al.

(10) Patent No.: US 8,340,293 B2
(45) Date of Patent: Dec. 25, 2012

(54) VERIFICATION SYSTEM, SERVER, AND ELECTRONIC INSTRUMENT

(75) Inventors: Atsushi Tomita, Toyohashi (JP);
Katsuaki Tajima, Toyokawa (JP);
Kenichi Matsumoto, Toyokawa (JP);
Kazuhiro Araki, Okazaki (JP)

(73) Assignee: Minolta Company, Ltd., Osaka-shi (JP)

( * ) Notice: Subject to any disclaimer, the term of this patent is extended or adjusted under 35 U.S.C. 154(b) by 1106 days.

(21) Appl. No.: 11/802,049

(22) Filed: May 18, 2007

(65) Prior Publication Data

US 2008/0093446 A1    Apr. 24, 2008

Related U.S. Application Data

(62) Division of application No. 10/357,510, filed on Feb. 4, 2003, now abandoned.

(30) Foreign Application Priority Data

Feb. 7, 2002 (JP) .................................. 2002-30476
Mar. 28, 2002 (JP) .................................. 2002-91550

(51) Int. Cl.
*H04K 1/00* (2006.01)
*G06F 11/00* (2006.01)
(52) U.S. Cl. .......................................... 380/258; 726/17
(58) Field of Classification Search .................. 380/258; 726/17
See application file for complete search history.

(56) References Cited

U.S. PATENT DOCUMENTS

| | | | | |
|---|---|---|---|---|
| 5,629,981 A | * | 5/1997 | Nerlikar ........................ | 713/168 |
| 5,757,916 A | * | 5/1998 | MacDoran et al. ........... | 380/258 |
| 5,796,827 A | | 8/1998 | Coppersmith et al. | |
| 6,049,611 A | * | 4/2000 | Tatebayashi et al. ........... | 380/44 |
| 6,058,476 A | * | 5/2000 | Matsuzaki et al. ............ | 713/169 |
| 6,058,477 A | * | 5/2000 | Kusakabe et al. ............. | 713/169 |
| 6,075,454 A | | 6/2000 | Yamasaki | |
| 6,088,450 A | | 7/2000 | Davis et al. | |

(Continued)

FOREIGN PATENT DOCUMENTS

EP    0 935 221 A2    8/1999

(Continued)

OTHER PUBLICATIONS

Tomita, A. et al. U.S. Office Action mailed Feb. 19, 2010, directed to a related U.S. Appl. No. 10/357,510; 14 pages.

(Continued)

*Primary Examiner* — Techane Gergiso
(74) *Attorney, Agent, or Firm* — Morrison & Foerster LLP

(57) ABSTRACT

The verification system of this invention comprises an image forming apparatus 1 having verification function and a card reader 2 for reading a user ID from a card. The image forming apparatus 1 is capable of performing short-range radio communication with a portable instrument 3. The portable instrument 3 receives a polling command transmitted by the image forming apparatus 1 and sends back its own identification code if it is located near the image forming apparatus 1. The image forming apparatus 1 permits usage of all the functions thereof if it verifies that user is an officially permitted person according to user ID read by the card reader 2 and the identification code sent back from the portable instrument 3. Consequently, there is provided a verification system having a high security level and convenient for use or a verification system which permits usage of its apparatus and other related devices within an appropriate range depending on the security level of a verified method.

9 Claims, 15 Drawing Sheets

U.S. PATENT DOCUMENTS

| | | | |
|---|---|---|---|
| 6,122,463 A * | 9/2000 | Nagatani | 399/80 |
| 6,148,094 A | 11/2000 | Kinsella | |
| 6,195,542 B1 | 2/2001 | Griffith | |
| 6,240,517 B1 * | 5/2001 | Nishioka | 726/20 |
| 6,442,532 B1 | 8/2002 | Kawan | |
| 6,490,443 B1 | 12/2002 | Freeny, Jr. | |
| 6,612,928 B1 * | 9/2003 | Bradford et al. | 463/29 |
| 6,651,168 B1 * | 11/2003 | Kao et al. | 713/185 |
| 6,832,721 B2 | 12/2004 | Fujii | |
| 6,937,732 B2 | 8/2005 | Ohmura et al. | |
| 7,031,945 B1 | 4/2006 | Donner | |
| 7,130,066 B1 * | 10/2006 | Kanematu | 358/1.15 |
| 7,287,270 B2 * | 10/2007 | Kai | 726/2 |
| 7,310,734 B2 * | 12/2007 | Boate et al. | 713/186 |
| 7,324,644 B2 * | 1/2008 | Saito | 380/200 |
| 7,360,248 B1 * | 4/2008 | Kanevsky et al. | 726/21 |
| 7,535,488 B2 * | 5/2009 | Wakao et al. | 348/207.1 |
| 2001/0036183 A1 | 11/2001 | Melick et al. | |
| 2002/0007291 A1 | 1/2002 | Miller et al. | |
| 2002/0062284 A1 | 5/2002 | Kawan | |
| 2002/0115426 A1 | 8/2002 | Olson et al. | |
| 2002/0123325 A1 | 9/2002 | Cooper | |
| 2002/0143634 A1 | 10/2002 | Kumar et al. | |
| 2002/0147926 A1 * | 10/2002 | Pecen et al. | 713/201 |
| 2002/0188842 A1 * | 12/2002 | Willeby | 713/154 |
| 2003/0025603 A1 | 2/2003 | Smith | |
| 2003/0038965 A1 * | 2/2003 | Simpson et al. | 358/1.15 |
| 2003/0115142 A1 | 6/2003 | Brickell et al. | |

FOREIGN PATENT DOCUMENTS

| | | |
|---|---|---|
| JP | 08-137800 A | 5/1996 |
| JP | 11-224236 A | 8/1999 |
| JP | 2000-341749 | 12/2000 |
| JP | 2001-003615 | 1/2001 |
| JP | 2001-022698 | 1/2001 |
| JP | 2001-109855 | 4/2001 |

OTHER PUBLICATIONS

Japanese Office Action dated Jan. 15, 2008, directed to counterpart Japanese Application No. 2002-091550 (7 pages).

Tomita et al., U.S Office Action mailed on Nov. 13, 2006 directed at U.S. Appl. No. 10/357,510; 18 pages.

Tomita et al., U.S Office Action mailed on Jul. 23, 2007 directed at U.S. Appl. No. 10/357,510; 18 pages.

Tomita et al., U.S Office Action mailed on Mar. 14, 2008 directed at U.S. Appl. No. 10/357,510; 18 pages.

Tomita et al., U.S Office Action mailed on Dec. 9, 2008 directed at U.S. Appl. No. 10/357,510; 18 pages.

Tomita et al., U.S Office Action mailed on Jun. 23, 2009 directed at U.S. Appl. No. 10/357,510; 15 pages.

* cited by examiner

FIG. 2

| Octet | | | | |
|---|---|---|---|---|
| 1 | COMMAND/RESPONSE FIELD BIT | SERVICE ACCESS POINT IDENTIFIER | | ADDRESS FIELD EXP |
| 2 | | | COMPACTED MOBILE SYSTEM IDENTIFIER | |
| 3 | | | | |
| 4 | | | | |
| 5 | | | MSI (MOBILE SYSTEM IDENTIFIER) | |
| 6 | ID INDICATION | | | |
| 7 | ID CONTROL | | | |
| 8 | | | | |

VERIFICATION SYSTEM, SERVER, AND ELECTRONIC INSTRUMENT

This application is a divisional of Ser. No. 10/357,510 filed Feb. 4, 2003, which is based on applications Nos. 2002-30476, 2002-91550 filed in Japan, the contents of which are hereby incorporated by reference.

BACKGROUND OF THE INVENTION

1. Field of the Invention

The present invention relates to a verification system for verifying whether or not use of an electronic instrument is permitted, a method, a server and electronic instrument and more particularly to a verification system whose security is intensified by employing plural verification methods, a method, a server and an electronic instrument.

2. Description of Related Art

Conventionally, upon use of an image forming apparatus such as a copying machine, various kinds of verification methods have been used. The verification system verifies whether or not user is a person who is dully permitted to use it. As a verification method, each user carries such a medium as a magnetic card in which his ID is registered or an IC card and throws that medium into the system so as to verify himself. The system reads out his ID from the thrown medium and checks whether or not that ID is an ID registered as a person permitted to use it. Consequently, the system determines whether or not he is permitted to use the system.

According to another method, a password is inputted with an input key provided on the apparatus. Further, as a verification system having a higher security, there are verification systems employing personal feature information such as finger print, voice print, face image and the like.

However, the above-described conventional verification systems have following problems. That is, the verification system employing such a medium as the magnetic card or IC card has such a fear that the medium may be stolen or copied so that it may be used illegally by a different person and therefore, the security performance of this system is low. The verification method by password input also has the same problem, which may be generated if the password leaks out. On the other hand, although the method using personal feature information has a very high security performance, its verification system is very expensive. Further, in case of an apparatus used by many people, it takes labor and time for each person to register his personal feature information and it also takes time for verification. For the reason, the verification system using personal feature information is not so convenient for use.

Any verification system determines whether or not a person of verification object is a person permitted to use an object apparatus according to verification information such as inputted password and user ID. The verification information is different among these verification systems. Correspondingly, the security level, which is a result of verification, differs among them.

However, the conventional verification system allows a verified person to use its apparatus without any limitation regardless of the security level, which is a result of the verification once he is verified to use. For example, such an apparatus as copying machine allows the verified person to use a common resource such as consumption goods and memory region freely. However, in this case, there is such a problem that it is not favorable to permit a person verified by only a verification system having a low security level to use its system without any limitation. The reason is that low-security level verification based on password input may cause an illegal procedure.

SUMMARY OF THE INVENTION

The present invention has been made in view of the above circumstances and has an object to overcome the above problems and to provide a high-security and usability of verification system and a server, an electronic instrument, an image processing apparatus and an image forming apparatus incorporated in the system, a verification method or verification system or the like capable of appropriately controlling permission/inhibition of apparatuses in accordance with security level determined by a verified method.

To achieve the objects and in accordance with the purpose of the invention as embodied and broadly described herein, there is provided a verification system consisting of an identification information receiving apparatus for receiving user's identification information, a server for receiving user's positioning information transmitted from an external instrument in a form of radio wave, and an electronic instrument, the verification system comprising: a first verification section for verifying a user based on user's identification information that the identification information receiving apparatus has received; a second verification section for verifying a user based on user's positioning information that the server has received from an external instrument; and permission giving section for permitting a user to use the electronic instrument in case both a verification result of the first verification section and that of the second verification section are no problem.

That is, in the present invention, a user who wants to use an electronic instrument has the identification information receiving apparatus identify the user's identification information by inputting codes through a keyboard, inserting a recoding medium, and the like. For using the electronic instrument, the user brings an external instrument. Thereby, the external instrument supplies user's positioning information to a server. In case both a verification result that the first verification section has made based on the user's identification information and a verification result that the second verification section has made based on the user's positioning information are no problem, the user is permitted to use the electronic instrument. Accordingly, there is a lower possibility that a fake is permitted to use compared with case of a verification based on only user's identification information. Therefore, the inventive verification system promises significantly high security. On the other hand, the inventive system does not require an expensive verification system based on personal feature information, which takes time to register and verify information. Accordingly, it is usable.

The inventive image processing apparatus is equipped with at lest two of the following typical examples of electronic instruments: a scanner that scans a document to obtain image data thereon, a printer that forms an image based on image data; and an image transmitting apparatus that transmits image data to other apparatus.

According to other aspect of the present invention, there is provided a server for receiving user's identification information and receiving user's positioning information transmitted from an external instrument in a form of radio wave, and determining to permit/not to permit the user to use an electronic instrument, the server comprising: a first verification section for verifying a user based on obtained user's identification information; a second verification section for verifying a user based on user's positioning information received from an external instrument; and permission giving section for permitting a user to use an electronic instrument in case both a verification result of the first verification section and that of the second verification section are no problem.

According to other aspect of the present invention, there is provided an electronic instrument for receiving user's identification information and receiving user's positioning information transmitted from an external instrument in a form of radio wave, the electronic instrument comprising: a first verification section for verifying a user based on obtained user's identification information; a second verification section for verifying a user based on user's positioning information received from an external instrument; and permission giving section for permitting a user to use the electronic instrument in case both a verification result of the first verification section and that of the second verification section are no problem.

According to other aspect of the present invention, there is provided a verification method for a verification system consisting of an identification information receiving apparatus for receiving user's identification information, a server for receiving user's positioning information transmitted from an external instrument in a form of radio wave, and an electronic instrument, the verification method comprising: a step to execute a first verification based on user's identification information that the identification information receiving apparatus has received; a step to execute a second verification based on user's positioning information that the server has received from an external instrument; and a step to permit a user to use the electronic instrument in case both a verification result of the first verification and that of the second verification are no problem.

According to other aspect of the present invention, there is provided a verification method for an image processing apparatus having least two of following items, a scanner that scans a document to obtain image data thereon, a printer that forms an image based on image data, and an image transmitting apparatus that transmits image data to other apparatus, the verification method comprising: a step to obtain user's identification information and execute a first verification based on the user's identification information; a step to obtain user's positioning information from an external instrument transmitting radio wave and execute a second verification based on the user's positioning information; and a step to permit a user to use the image processing apparatus in case both a verification result of the first verification and that of the second verification are no problem.

According to other aspect of the present invention, there is provided a verification system incorporating a first electronic instrument and a second electronic instrument both of which are permitted/not permitted to operate in accordance with two or more verification results based on two or more verification methods, the verification system comprising a permission restricting section that restricts an operation permission for one of the first and second electronic instruments based on a single verification in accordance with either a first verification method or a second verification method in case an operation permission for other one of the first and second instruments has been made based on a double verification in accordance with both the first verification method and the second verification method, wherein, under situation such that operation for the first electronic instrument has been permitted based on a single verification in accordance with either the first verification method or the second verification method, in case a double verification for the second electronic instrument is executed in accordance with both the first verification method and the second verification method including a verification content of which is same as the single verification by a first electronic instrument, the permission restricting section inhibits operation for the first electronic instrument.

According to other aspect of the present invention, there is provided a verification system incorporating a first electronic instrument and second electronic instrument both of which are permitted/not permitted to operate in accordance with two or more verification methods, the verification system comprising a permission restricting section that restricts an operation permission for one of the first and second electronic instruments based on a single verification in accordance with either a first verification method or a second verification method in case an operation permission for other one of the first and second instruments has been made based on a double verification in accordance with both the first verification method and the second verification method, wherein, under situation such that operation for the first electronic instrument has been permitted based on a double verification in accordance with both the first verification method and the second verification method, in case a single verification for the second electronic instrument is executed in accordance with either the first verification method or the second verification method including a verification content of which is common to the verification for a first electronic instrument, the permission restricting section inhibits operation for the second electronic instrument.

According to other aspect of the present invention, there is provided a verification system incorporating a first electronic instrument and second electronic instrument both of which are permitted/not permitted to operate in accordance with two or more verification methods, the verification system comprising a permission restricting section that restricts an operation permission for one of the first and second electronic instruments based on a single verification in accordance with either a first verification method or a second verification method in case an operation permission for other one of the first and second instruments has been made based on a double verification in accordance with both the first verification method and the second verification method, wherein, after an operation with a double verification in accordance with both the first verification method and the second verification method for the first electronic instrument finished, in case a single verification for the second electronic instrument in accordance with either the first verification method or the second verification method is made including a verification content common to verification for the first electronic apparatus, the permission restricting section determines to permit/not to permit the second apparatus to operate based on positioning information of the first and second electronic instruments and verification time information relating to the second electronic instrument.

According to other aspect of the present invention, there is provided a verification method for verification system incorporating a first electronic instrument and a second electronic instrument both of which are permitted/not permitted to operate in accordance with two or more verification results based on two or more verification methods, wherein, under situation such that operation for the first electronic instrument has been permitted based on a single verification in accordance with either the first verification method or the second verification method, in case a double verification for the second electronic instrument is executed in accordance with both the first verification method and the second verification method including a verification content of which is same as the single verification by a first electronic instrument, operation for the first electronic instrument is inhibited.

According to other aspect of the present invention, there is provided a verification method for a verification system incorporating a first electronic instrument and a second electronic instrument both of which are permitted/not permitted to operate in accordance with two or more verification results based on two or more verification methods, wherein, under situation such that operation for the first electronic instrument has been permitted based on a double verification in accordance with both the first verification method and the second verification method, in case a single verification for the second electronic instrument is executed in accordance with either the first verification method or the second verification method including a verification content of which is common to the verification for a first electronic instrument, operation for the second electronic instrument is inhibited.

That is, in the inventive verification system, in case verifications made for two electronic instruments include same content, operation for an electronic instrument verified double in accordance with two verification system is preceded to other electronic instrument verified in accordance with one verification system. This is because credibility of verification differs between single verification and double verification. Furthermore, in case there is time difference between double verification and single verification, operation permission is determined based on positioning information between electronic instruments and verification time information. Accordingly, in case verifications of two instruments are made taking time interval that is not long enough for a user to move between the two instruments, use of the instrument verified later is not permitted. It should be noted that content of time information may be time interval between verification of a first instrument and verification of a second instrument, and time interval between completion of operation for a first instrument and verification of a second instrument. According to the present invention, permission/inhibition of instruments is controlled appropriately depending on security level verified in accordance with verification system.

The inventive verification apparatus or the image processing apparatus, or the image forming apparatus, or the verification apparatus, comprises: a first verification section for conducting verification in accordance with first verification method; a second verification section for conducting verification in accordance with second verification method; and an operation restricting section for restricting an operation based on verification results obtained by the first verification section and the second verification section, wherein in case a single verification by either the first verification section or the second verification section is made, the operation restricting section permits to operate with functions narrower than a case of an operation double verified by both the first verification section and the second verification section.

According to other aspect of the present invention, there is provided a verification method using a first verification method and a second verification method, wherein in case a single verification in accordance with either the first verification method or the second verification method is made, operation with functions narrower than a case of an operation double verified by both the first verification method and the second verification method is permitted.

That is, in the present invention, a user verified double in accordance with the first and second verification systems is permitted to widely use functions of an apparatus. This is because credibility of the verification is high. On the other hand, a user verified single in accordance with one of the first and second verification system is permitted use restricted functions of the apparatus because credibility of the verification is low.

BRIEF DESCRIPTION OF THE DRAWINGS

For a better understanding of the present invention, reference is made to the following detailed description of the invention, just in conjunction with the accompanying drawings in which:

FIG. 2 is a data structure diagram showing format of identification codes for a cellular phone;

DETAILED DESCRIPTION OF THE PREFERRED EMBODIMENTS

Hereinafter, the embodiments of the present invention will be described in detail with reference to the accompanying drawings.

First Embodiment

In this embodiment, an apparatus, which is an object for permission or non-permission of use, is an image forming apparatus and the verification processing is carried out with the image forming apparatus.

Figure 1:
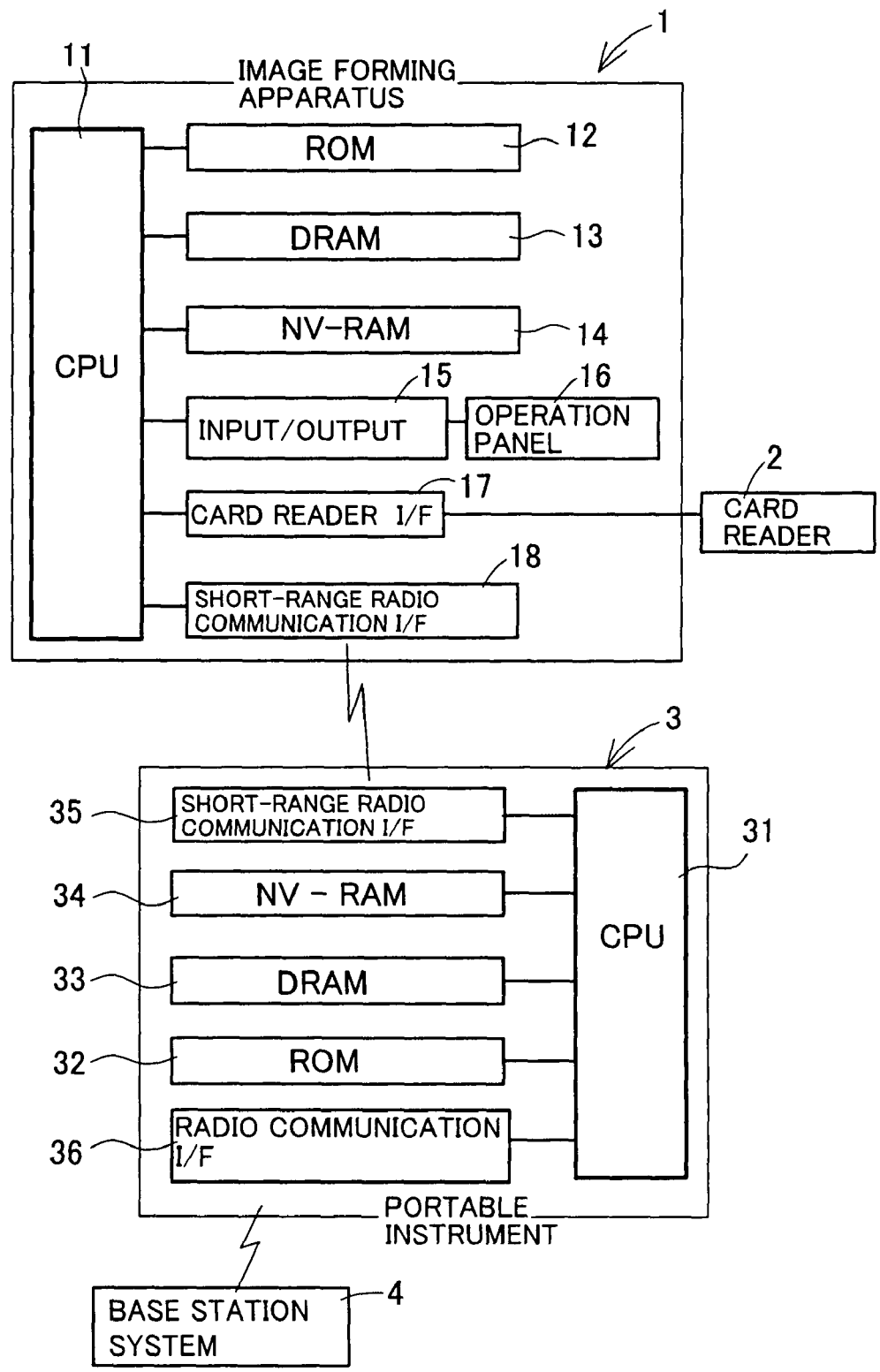
FIG. 1 is a block structure diagram showing a verification system directed to a first embodiment.

The system of this embodiment is constructed as shown in FIG. 1. That is, this system comprises an image forming apparatus 1, which is an electronic instrument and a server, a card reader 2 capable of communicating with the image forming apparatus 1, a portable instrument 3, which is an external instrument and is capable of executing short-range radio communication with the image forming apparatus 1 and a base station system 4 capable of communicating with the portable instrument 3. The image forming apparatus 1 is an apparatus having image forming function, such as a copying machine and contains facsimile function and scan mail function. In FIG. 1, a portion corresponding to the image forming function is omitted from its representation. The card reader 2 is an ordinary card reader capable of reading a magnetic card or IC card (hereinafter referred to as just a card). Although the card reader 2 is separated from the image forming apparatus 1 here, it may be incorporated in the image forming apparatus 1.

The portable instrument 3 is an ordinary communication unit which user carries with himself. The base station system 4 is constituted of plural radio communication bases capable of acquiring position information by communicating with the portable instrument 3.

As shown in FIG. 1, in the image forming apparatus 1, a ROM 12, a DRAM 13, a NV-RAM 14, an input/out 15, a card reader I/F 17 and a short-range radio communication I/F 18 are connected to a CPU 11 for executing the entire control. The ROM 12 is a memory storage unit for storing a program describing control procedure of the image forming apparatus 1 and data. The DRAM 13 is a volatile memory unit for temporarily storing such image forming condition as magnification, density and double-sided copy relating to image forming processing and used as a working region. The NV-RAM 14 is a non-volatile memory unit for storing various kinds of settings relating to image forming processing.

An operation panel 16 is connected to the input/out 15. The operation panel 16 contains various kinds of key switches and a liquid crystal displayer. The various kinds of the key switches include a copy button for specifying a start of image forming processing and ten keys for numerical data input. The liquid crystal displayer displays various kinds of messages for user as required and soft keys for inputting various kinds of settings such as paper size, print density, magnification change, paper discharge mode. The card reader I/F 17 is connected to an external card reader 2 and communicates with the card reader 2. The short-range radio communication I/F 18 is an apparatus for carrying out short-range radio communication by sending or receiving radio waves. The short-range radio communication I/F 18 is capable of communicating with a short-range radio communication I/F of other unit nearby.

The card reader 2 is a unit for acquiring identification information such as user ID by reading a card inserted by user. The card reader 2 contains switches which are turned ON physically when a card is inserted, these switches being disposed at its front and rear sides in order to detect a card insertion condition. Further, the card reader 2 contains a liquid crystal displayer for notifying user with a card reading error or the like.

In the portable instrument 3, a ROM 32, a DRAM 33, a NV-RAM 34, a short-range radio communication I/F 35 and a radio communication I/F 36 are connected to a CPU 31 for executing the entire control. The ROM 32, DRAM 33 and NV-RAM 34 are substantially the same units as the ROM 12, DRAM 13 and NV-RAM 14 in the image forming apparatus 1 and store not image forming data but communication data. If the portable instrument 3 exists near the image forming apparatus 1, the short-range radio communication I/F 35 is capable of communicating with the short-range radio communication I/F 18 of the image forming apparatus 1. Although a communication device such as a portable phone is used as the portable instrument 3 here, the radio communication I/F 36 for communication is provided separately from the short-range radio communication I/F 35. For the reason, its voice communication condition is not affected even if communication by the short-range radio communication I/F 35 is being carried out and even during communication, short-range radio communication by the short-range communication I/F 35 is possible. Further, the radio communication I/F 36 is capable of communicating with the base station system 4 for voice communication.

Figure 3:
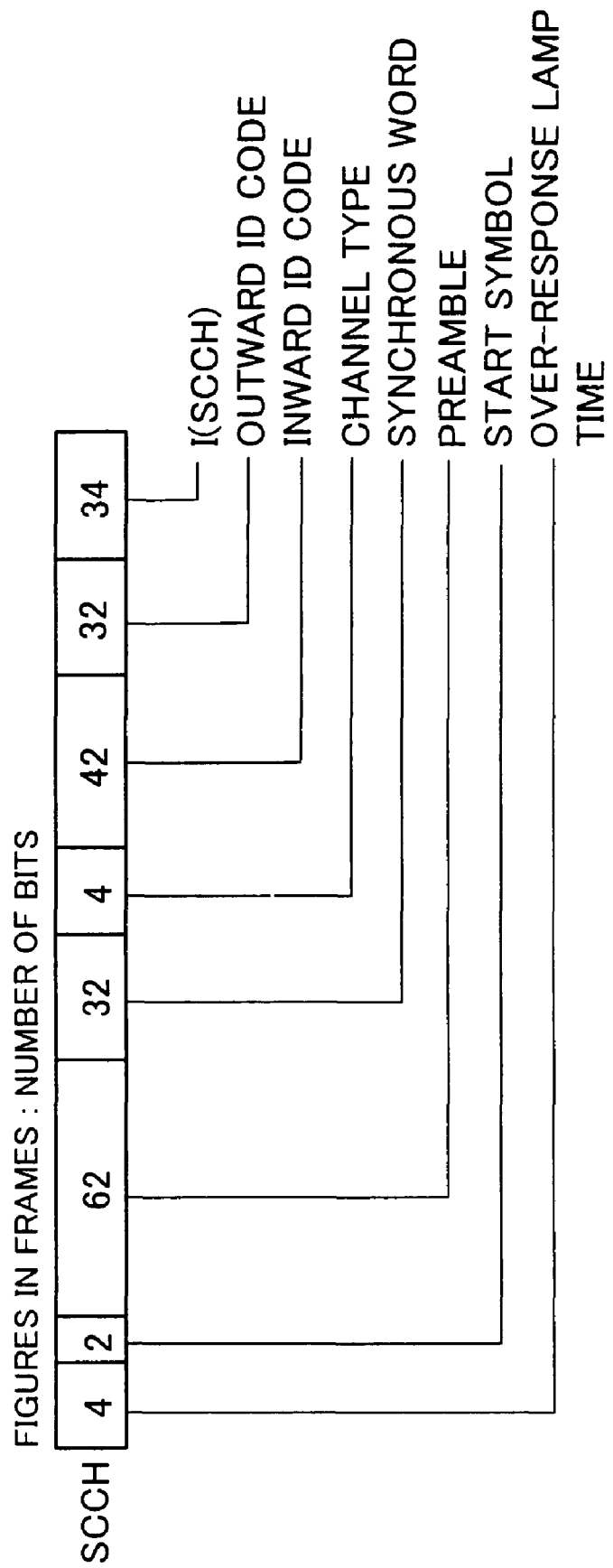
FIG. 3 is a data structure diagram showing format of identification codes for a simple cellular phone.

In case of the portable phone or a compact type portable phone, individual portable terminals are provided with inherent identification codes for identifying from other terminals and these codes are stored in the NV-RAM 34. This identification code format is unified according to a standard. FIG. 2 shows MSI (Mobile System Identifier) format, which is an identification code of the portable phone. FIG. 3 shows the format of individual cell channel (SCCH) in a control physical slot of logical control channel (LCCH) of the compact type portable phone. In case of Japan, as an identification code, a unique number is attached to each terminal by Corporation of National Land Radio/Shadan-houjin Zenkoku Rikujo Musen Kyokai. The portable instrument 3 is constructed to send this MSI or SCCH if it receives a polling command from outside through the short-range radio communication I/F 35.

Next, the verification operation of this system will be described. A different user ID is allocated to individual user who is permitted to use the image forming apparatus 1 and a card in which user ID is recorded is distributed to that user. The card mentioned here is a name card of an employee or a registration card registered in his facility or so on. This card corresponds to a medium and the user ID recorded in the card corresponds to identification information. Instead of distributing the card, it is permissible to store individual user ID and input it into the operation panel 16 as a password.

Further, an identification code of the portable instrument 3 which individual user possesses personally is investigated and registered in system corresponding to user ID. Thus, a use permission table is created by making the user ID of user permitted to use the image forming apparatus 1 correspond to the identification code of the portable instrument 3 of that user and memorized in the NV-RAM 14. Table 1 shows an example of the use permission table.

TABLE 1

| USER ID | ID Number of Portable Instrument |
|---------|----------------------------------|
| 000001  | 1111111                          |
| 000002  | 2222222                          |
| 000003  | 3333333                          |
| .       | .                                |
| .       | .                                |
| .       | .                                |

When using the image forming apparatus 1, user inserts his own card into the card reader 2. If the card is inserted into the card reader 2, it automatically reads user ID, which is its content, and transmits it to the image forming apparatus 1. The image forming apparatus 1, after receiving the user ID, transmits a polling command through the short-range radio communication I/F 18. After receiving the polling command, the portable instrument 3 automatically sends back an identification code. The image forming apparatus 1 receives the identification code sent back from the portable instrument 3 through the short-range radio communication I/F 18. Here, the identification code sent back from the portable instrument 3 recognizes that an owner of the portable instrument 3 exists nearby. This information corresponds to position information. In the meantime, the portable instrument 3 acquires its own current position information by communication with the base station system 4 or the GPS system through the radio communication I/F 36 as required. If the current position information according to this method is employed with the above-described position information, a higher verification is enabled.

Next, the image forming apparatus 1 checks whether or not a card user ID has been registered by referring to the use permission table of Table 1. As a result, it can be checked whether or not that card is a card of user permitted to use the image forming apparatus 1. If it is not a card of user permitted to use, usage of the image forming apparatus 1 is not permitted. The verification of this card corresponds to the first verification means.

If it is a card of user permitted to use the image forming apparatus 1, whether or not an identification code sent back from the portable instrument 3 is an identification code corresponding to that user ID is checked by referring to the use permission table of Table 1. Consequently, whether or not user who owns the portable instrument 3 corresponding to the card user ID exists in a short distance from the image forming apparatus 1 can be verified. Verification by making the identification code of the portable instrument 3 corresponds to the user ID corresponds to a second verification means.

If the card user ID and identification code of the portable instrument 3 are registered together in the use permission table, usage of the image forming apparatus 1 is permitted. If corresponding identification code cannot be received when a registered card is inserted, it indicates that the portable instrument 3 of that user does not exist nearby. For the reason, the system does not allow that user to use the image forming apparatus 1. Thus, recognizing that the card and the portable instrument 3 are possessed at the same time enables to prevent illegal use thereof because the card is stolen. This ensures a higher security system as compared to a case where the verification is done with only the card.

Figure 4:
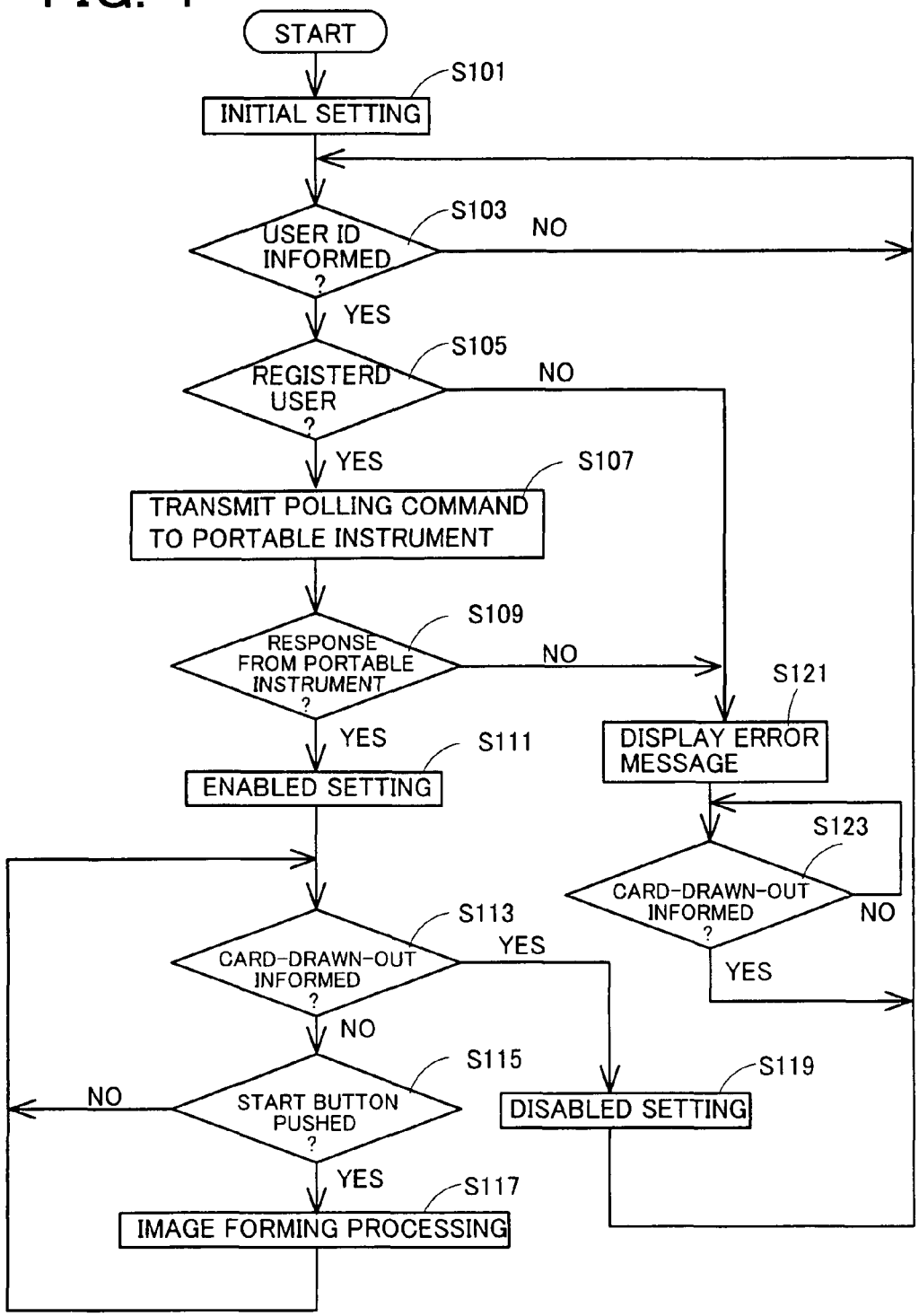
FIG. 4 is a flowchart showing processing by an image forming apparatus in verification processing.
Figure 5:
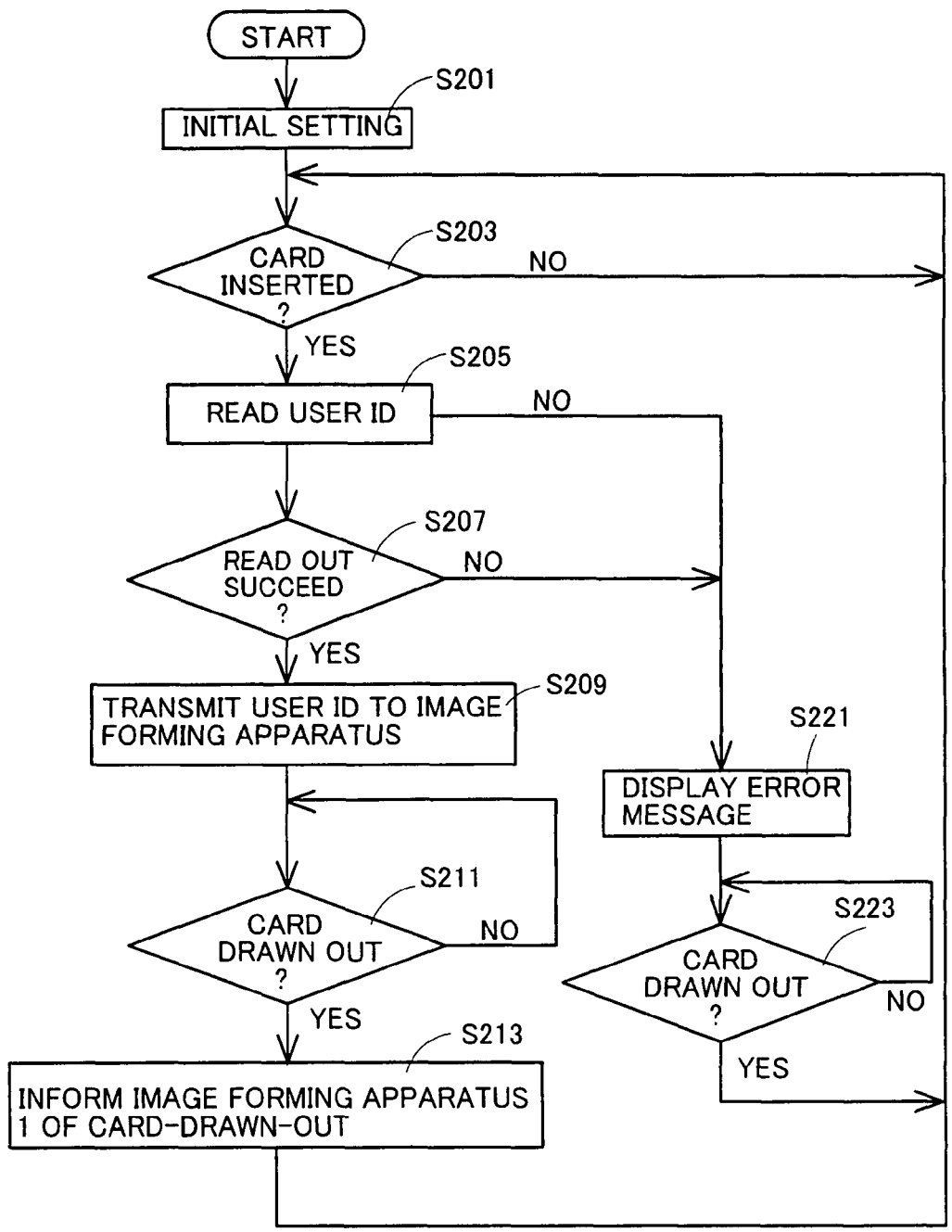
FIG. 5 is a flowchart showing processing by a card reader in verification processing.
Figure 6:
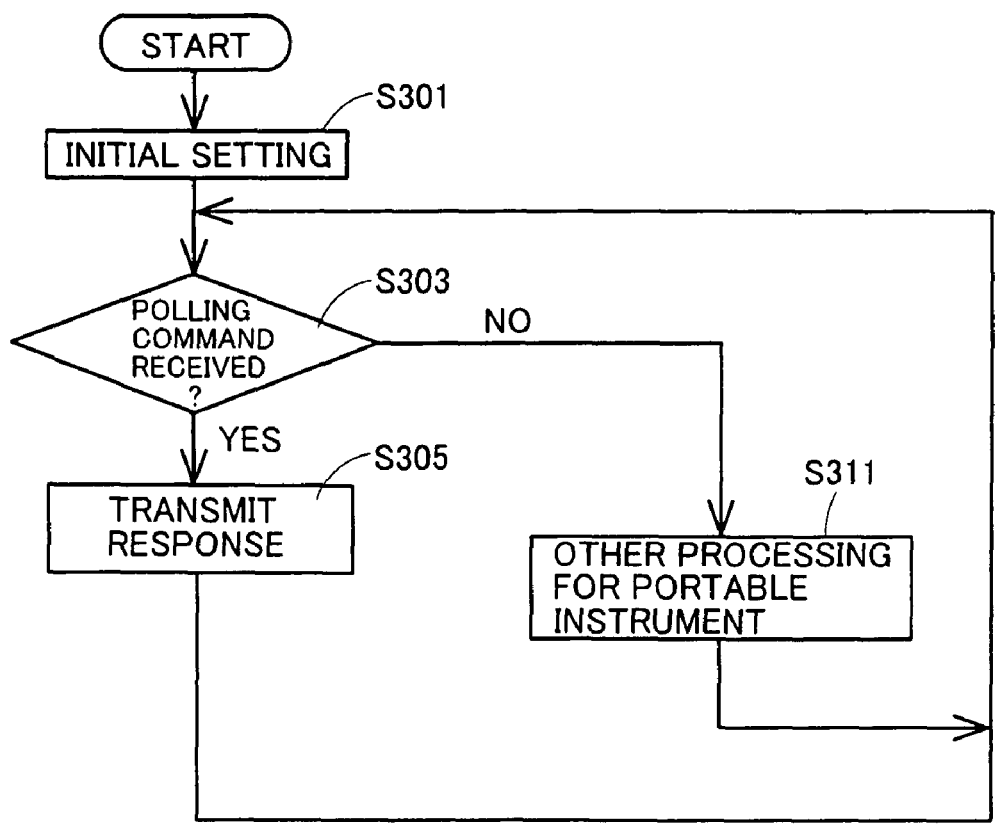
FIG. 6 is a flowchart showing processing by a portable instrument in verification processing.

Next, verification processing control based on this system will be described with reference to flow charts of FIGS. 4-6. Each flow chart indicates processing with the image forming apparatus 1, the card reader 2, and the portable instrument 3. These processings are executed in parallel and continued by exchange of data among these.

First, the processing of the image forming apparatus 1 will be described with reference to a flow chart of FIG. 4. The processing of the image forming apparatus 1 is started when its power supply is turned on and first, initial setting such as DRAM 13 clearing, setting of standard mode is carried out (S101). After that, the CPU 11 of the image forming apparatus 1 stands by until the card reader I/F 17 receives a notification of the user ID from the card reader 2 (S103).

When the user ID is notified from the card reader 2 (S103: Yes), the CPU 11 refers to the usage permission ID table stored in the NV-RAM 14. Then, whether or not that user ID is registered is checked (S105). If the notified user ID is not registered in the usage permission ID table (S105: No), the CPU 11 displays a message saying "the image forming apparatus 1 cannot be used" on the liquid crystal displayer of the operation panel 16 (S121). After that, the system stands by until a card removal notification comes from the card reader 2 (S123). If the card removal notification comes (S123: Yes), the processing returns to S103. Then, the system stands by until the user ID is notified from the card reader 2 again (S103).

If the user ID notified from the card reader 2 is registered in the use permission table in S105 (S105: Yes), the CPU 11 transmits a polling command through the short-range radio communication I/F 18 (S107). Then, the system waits for a response from the portable instrument 3 (S109).

If no response comes from the portable instrument 3 or a received identification code is different from a number corresponding to the user ID (S109: No), the verification is disabled. The reason is that a person who inserts a card into the card reader 2 is considered not to be an owner of that card. In this case, the CPU 11 displays a message saying "the image forming apparatus 1 cannot be used" on the liquid crystal displayer of the operation panel 16 (S121). After that, the system stands by until the card removal notification comes from the card reader 2 (S123). If the card removal notification comes (S123: Yes), the processing returns to S103.

If the identification code sent back by the portable instrument 3 is a number corresponding to the user ID in S109 (S109: Yes), it means that the portable instrument 3 of an original owner of that card exists in a short distance. In this case, the CPU 11 sets up a permission for use of the image forming apparatus 1 (S111). The reason is that a person inserting the card into the card reader 2 is an original owner of that card. After that, the system stands by until the card is removed from the card reader 2 (S113: Yes) or a start button is pressed by the user (S115: Yes). If no card removal notification comes from the card reader 2 (S113: No) and the start button is pressed by the user (S115: Yes), image formation processing such as copy is carried out (S117). After the processing, the system stands by until the card removable notification comes from the card reader 2 (S113: Yes) or the start button is pressed by the user (S115: Yes).

If the card removable notification comes from the card reader 2 (S113: Yes), usage by this user is terminated and usage prohibition is set up (S119). Then, the system stands up unit the user ID is notified from the card reader 2 (S103). The image forming apparatus 1 repeats the above-described processing until the power supply is turned off.

Next, the processing of the card reader 2 will be described with reference to a flow chart of FIG. 5. When the power supply is turned on, the card reader 2 starts the processing so as to execute initial setting (S201). Then, the system stands by until the user inserts his card (S203).

If the user inserts the card (S203: Yes), the card reader 2 reads out his user ID from that card (S205). Then, whether or not reading of the user ID succeeds is determined (S207). If reading of the card fails because a different card is inserted or card information is damaged (S207: No), an error message is displayed on the liquid crystal displayer of the card reader 2 (S221). In this case, the system stands by until the card is removed (S223). If the card is removed (S223: Yes), the system stands by until the card is inserted (S203).

If reading of the user ID from the card succeeds (S207: Yes) in S207, the read user ID is transmitted to the image forming apparatus 1 (S209). This transmission is the user ID notification shown in S103 of FIG. 4. After that, the card reader 2 stands by until the card is removed (S211). If the card is removed (S211: Yes), the card removal notification is transmitted to the image forming apparatus 1 (S213). This transmission is the card removal notification shown in S113 or S123 of FIG. 4. After the card removal notification is transmitted, the card reader 2 stands by until a next card is inserted (S203). The card reader 2 repeats the above-described processing until the power supply is turned off.

Next, the processing on the portable instrument 3 will be described with reference to the flow chart of FIG. 6. When the power supply is turned on, the portable instrument 3 starts its processing so as to execute initial setting (S301). Then, whether or not a polling command has been received is determined (S303). Unless the polling command is received (S303: No), other processing of the portable communication unit such as communication processing is carried out (S311). If the polling command is received (S303: Yes), an identification code is sent back as a response (S305). The portable instrument 3 repeats the above described processing until the power supply is turned off.

Second Embodiment

Figure 7:
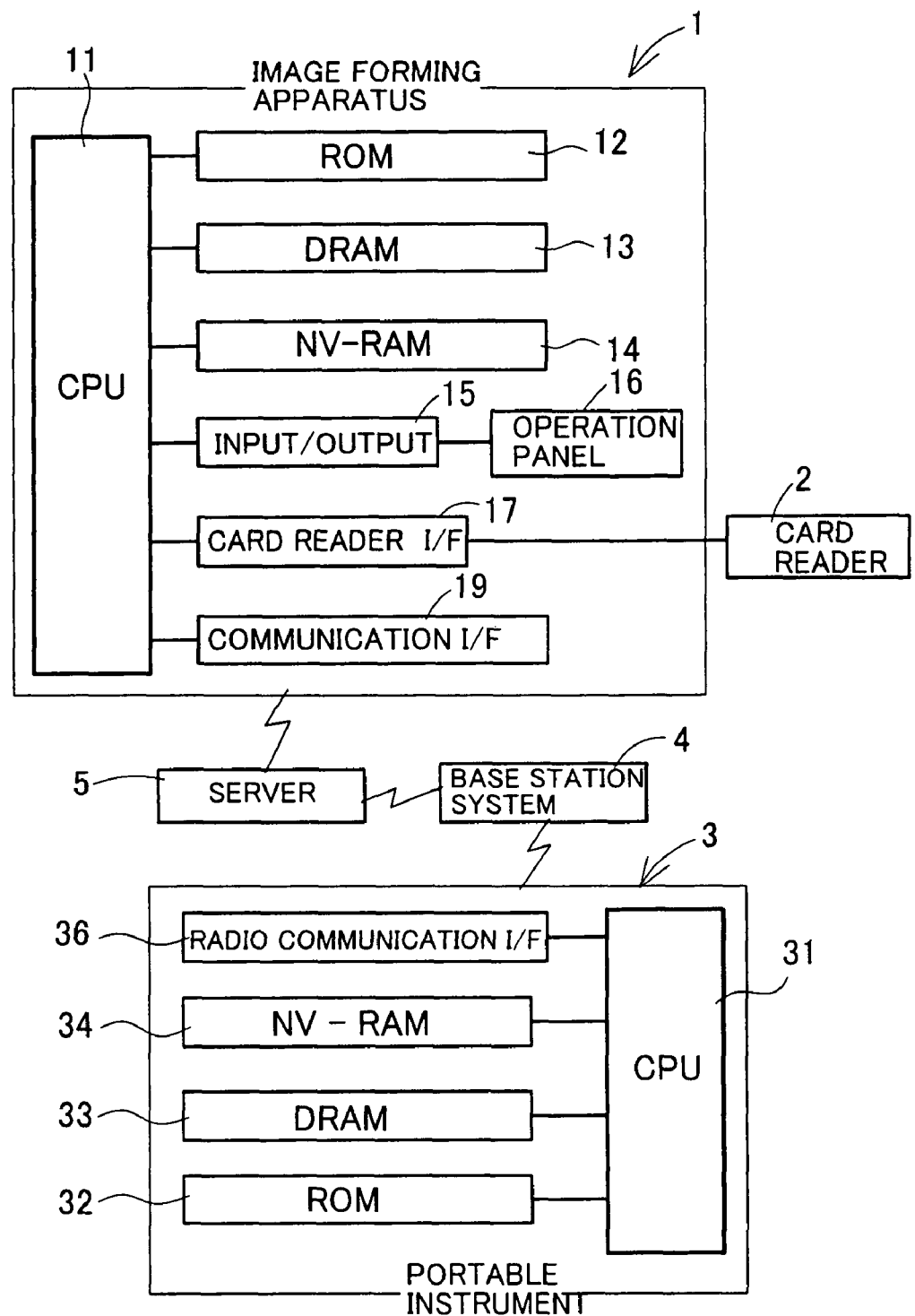
FIG. 7 is a block structure diagram showing a verification system directed to a second embodiment.

The system of this embodiment is constructed as shown in FIG. 7. That is, this system comprises the image forming apparatus 1, which is an electronic instrument, the card reader 2 capable of communicating with the image forming apparatus 1, the portable instrument 3, which is an external instrument, the base station system 4 capable of communicating with the portable instrument 3 by radio and the server 5 capable of communicating with the image forming apparatus 1. The image forming apparatus 1, the card reader 2, the portable instrument 3 and the base station system 4 are the same devices as those of the first embodiment. The server unit 5 is an ordinary unit having CPU, memory unit and the like. The image forming apparatus 1 is capable of communicating with the server 5 through communication I/F 19.

According to this embodiment, a unit which is an object for permission or non-permission of its usage is the image forming apparatus 1 and the verification processing is carried out in the server 5. The use permission table is disposed in a memory unit of the server 5, while counterpart of it is provided on the NV-RAM 14 of the image forming apparatus 1 in case of the first embodiment.

According to this embodiment, the image forming apparatus 1 sends a user ID acquired from the card reader 2 to the server 5. The server 5, after receiving the user ID from the image forming apparatus 1, checks whether or not that user ID is registered in the use permission table. This procedure corresponds to the first verification means. Further, the server 5 communicates with the base station system 4 so as to acquire the position of the portable instrument 3 having an identification code corresponding to that user ID. Consequently, whether or not the portable instrument 3 exists near the image forming apparatus 1 is checked. This procedure corresponds to the second verification means. Then, if the verification results of the first and second verification means are acceptable, the server 5 permits this user to use the image forming apparatus 1.

As described above, according to the first and second embodiments, the image forming apparatus 1 or the server 5 acquires the user ID read from the card by the card reader 2 and further an identification code of the portable instrument 3 through communication with the portable instrument 3. Then, only if the user ID of the card and the identification code of the portable instrument 3 correspond to each other and are registered in the use permission table, usage of the image forming apparatus 1 is permitted. Therefore, a much higher security performance is ensured as compared to a case where the verification is carried out with only the card. Further, because this does not require an expensive system which takes time for registration and verification like personal feature information, a well convenient system is achieved.

According to the first and second embodiments, an electronic instrument whose usage is permitted or not permitted is not restricted to an image forming device. According to the second embodiment, the server 5 may only carry out verification while determination of permission or non-permission may be carried out by the image forming apparatus 1. Further, although according to the second embodiment, a short-range radio communication portion for sending a polling command is omitted from its representation, it may be transmitted from the image forming apparatus 1 or may be transmitted from the base station system 4 through the server 5.

Third Embodiment

According to this embodiment, the present invention has been applied to a system in which plural copying machines are connected to a network such as LAN while each copying machine contains verification means based on two kinds of verification systems.

Figure 8:
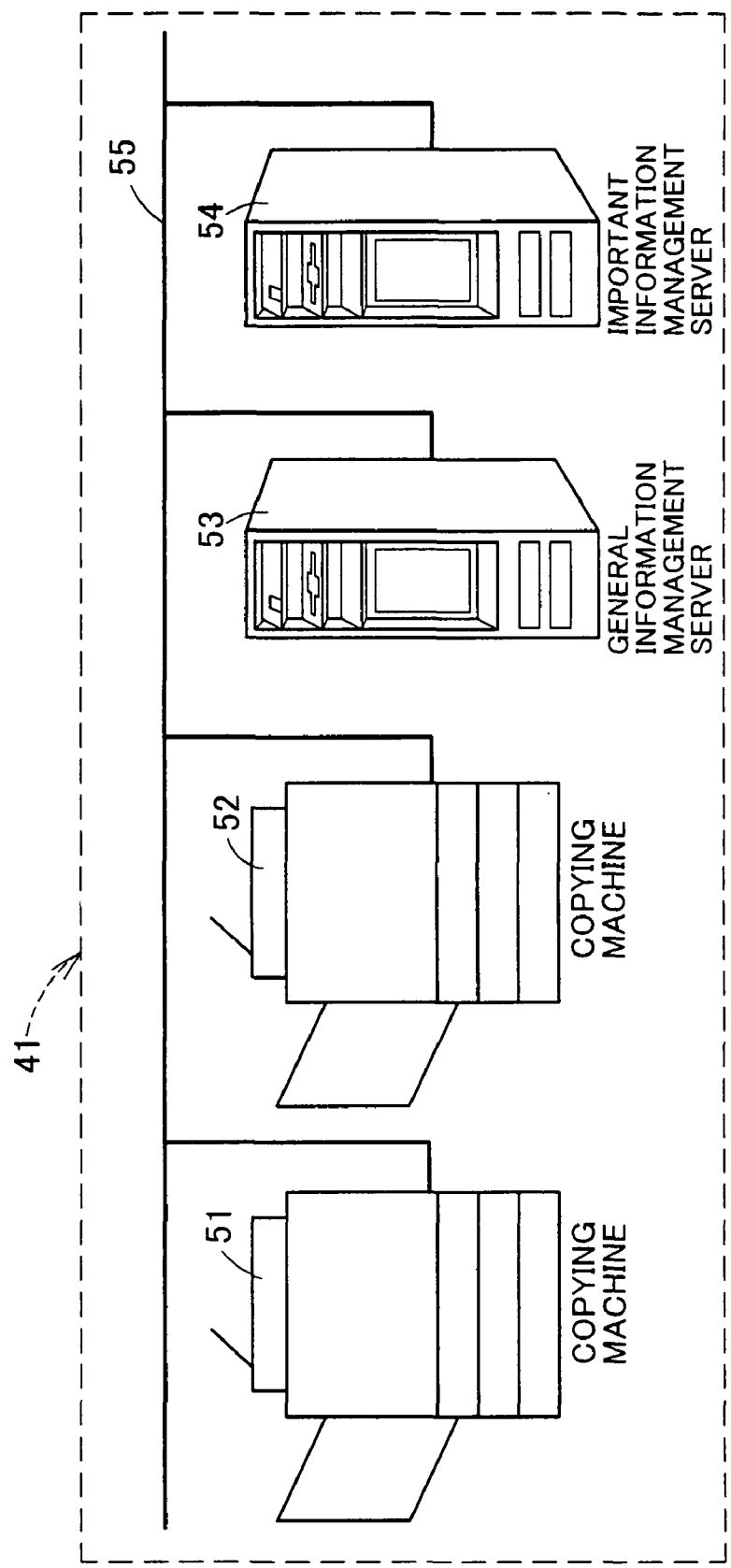
FIG. 8 is a block structure diagram showing a verification system directed to a third embodiment.

First, a verification system 41 of this embodiment is constructed as shown in FIG. 8. That is, a copying machine 51, a copying machine 52, a general information management server 53 and an important information management server 54 are connected to the LAN 55. The copying machine 51 and the copying machine 52 have facsimile function and scan mail function like the image forming apparatus 1 of the first and second embodiments and cannot be used until its usage is permitted. Although the two copying machines (copying machine 51 and copying machine 52) are indicated in the same Figure, it is permissible to use a system 41 in which more copying machines or other devices are connected. Further, other servers than the general information management server 53 and the important information management server 54 may be connected thereto.

The copying machines 51, 52 of this system 41 have verification means based on two verification systems, namely, verification by password input and verification with the portable communication unit. The verification by password input is carried out by user's inputting his password. Thus, the respective copying machines 51, 52 contain a liquid crystal displayer for displaying various kinds of messages and key switches 61, 62 (see FIG. 9) which allow a password to be inputted. Instead of inputting the password, it is permissible to distribute a card in which each person's user ID is recorded and read it with the card reader.

Verification with the portable instrument is carried out by communication with such a portable instrument as a portable phone owned by user personally. Thus, the respective copying machines 51, 52 have the same short-distance communication function as the first and second embodiments. The respective copying machines 51, 52 execute verification processing according to the identification code received through this short-distance communication function. This verification method is validated only if user carries his own portable instrument 42 with its power ON and requires no special operation or input processing.

The respective copying machines 51, 52 contain each memory device. The respective memory devices store a password allocated to each user for use in the verification and an identification code of the portable instrument 42 possessed by user personally, wherein each password and each identification code are linked together. That is, this contains a table in which the "user ID" column in table 1 described in the first embodiment is replaced with the column of password. The table of each memory may be different between the copying machine 51 and the copying machine 52. For example, there can be a common user who is allowed to use both the copying machines or a user allowed to use only any one.

The general information management server 53 and the important information management server 54 are ordinary servers for storing various kinds of data and controlling the entire system 41. Data stored in the general information management server 53 is only information having a relatively low security degree. Contrary to this, data stored in the important information management server 54 contains information having a high security degree. Further, the general information management server 53 stores various kinds of information relating to verification processing. Then, they control the verification condition by communication with the respective copying machines 51, 52 connected to the LAN 55. A permission restricting means is achieved in the general information management server 53.

Next, a basic verification processing action in the verification system 41 of this embodiment will be described. User of the respective copying machines 51, 52 inputs his own password using key switches 61, 62 attached to each copying machine. Here, the password is an indispensable condition and the copying machines 51, 52 cannot be used until the password is inputted. The respective copying machines 51, 52 compare the inputted password with the content of table and if that password is not a registered password which permits the verification, it is indicated on a liquid crystal displayer.

If the inputted password is a registered password, the respective copying machines 51, 52 transmit a polling command. Its purpose is to receive an identification code of the portable instrument 42 located within an area at a short distance. Then, whether or not an identification code corresponding to the inputted password on the same table is received is determined. If the respective copying machines 51, 52 succeed to receive the identification code corresponding to the password, they verify that person as a double verified user having a high verification reliability. If they cannot receive the identification code, they verify the person as a single verified user having a low verification reliability.

When the user is verified, the respective copying machines 51, 52 transmit its verification information to the general information management server 53 through the LAN 55. If the verified person is the double verified user, the transmitted verification information is inputted password and an identification code acquired from the portable instrument 42 of the user. If the verified person is the single verified user, the transmitted verification information is only the inputted password. The general information management server 53 determines whether or not usage of the copying machines 51, 52 is permitted based on the verification information received from the respective copying machines 51, 52. Then, it transmits an enable signal or a disable signal to the respective copying machines 51, 52. If the enable signal is received, the respective copying machines 51, 52 are set up for permission of usage, so that usage thereof is permitted. If the disable signal is received, it is indicated on a liquid crystal displayer so that the copying machine is set up for prohibition of the usage.

The general information management server 53 determines whether or not usage of the copying machines 51, 52 is permitted, as follows. The general information management server 53 searches the verification information of user currently using other copying machine if it receives the verification information of a newly verified user. Then, it checks whether or not there is any user verified based on the same password as a password contained in the verification information of the newly verified user. Because the same person cannot use plural copying machines at the same time, if there is a user verified based on the same password, there is a possibility that any one uses that password illegally.

In this case, if any user is the double verified user while the other user is the single verified user, usage by the double verified user is permitted and usage by the single verified user is prohibited. If every user is the single verified user, a first verified user is permitted to use while the latter verified person is prohibited from using. If every user is the double verified user and uses a different identification code, usage of both the users is permitted. The reason is that any user is considered to be a proper user.

Figure 9:
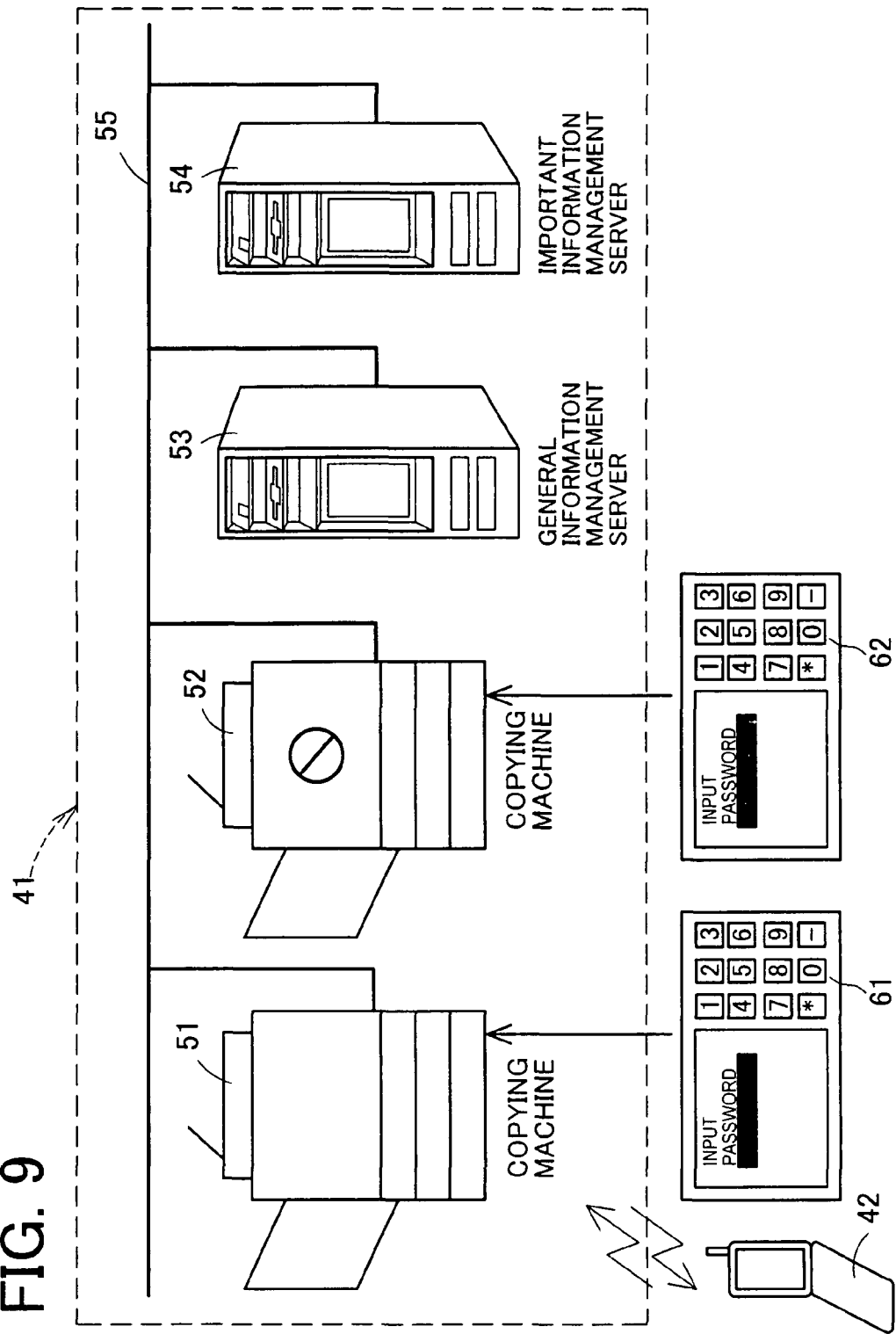
FIG. 9 is a diagram for illustrating an operation of a verification system.

FIG. 9 shows that user verified by the copying machine 51 is the double verified user and the user verified by the copying machine 52 is the single verified user. Here, it is assumed that the passwords of both the users are the same. In this case, the user of the copying machine 51 is permitted to use while the user of the copying machine 52 is prohibited from using. The same thing can be said if the user of the copying machine 52 is verified first and starts its usage. In this case, if the user of the copying machine 51 is verified, after that, usage of the user of the copying machine 52 is disabled.

The above-described prohibition of use by the single verified user is adapted for a while after use of the other user is ended. For that purpose, the respective copying machines 51, 52, after use of the user is ended, transmit a finish signal to the general information management server 53 and waits for the next verification. The general information management server 53 holds the verification information for a while after the finish signal is received. Then, a password inputted by user newly verified by the other copying machine after use of one copying machine is ended is compared with a password inputted by the user whose usage is ended at the time of start of his usage. If both the passwords are equal, whether or not usage of the latter user is permitted is determined according to an elapsed time T until a password is inputted by the latter user since the usage by a preceding user is ended and a distance D between both copying machines.

That is, the permission of usage is determined depending on whether or not the user can move from the position of one copying machine to the position of the other copying machine within the elapsed time T. For that purpose, a reference moving time between the respective machines is set up preliminarily and stored in the memory unit. If the elapsed time T is longer than the stored reference moving time and it is determined that he can move, the usage of the latter user is permitted. However, if the elapsed time T is too short and it is determined that he cannot move, the usage of the latter user is prohibited.

Figure 10:
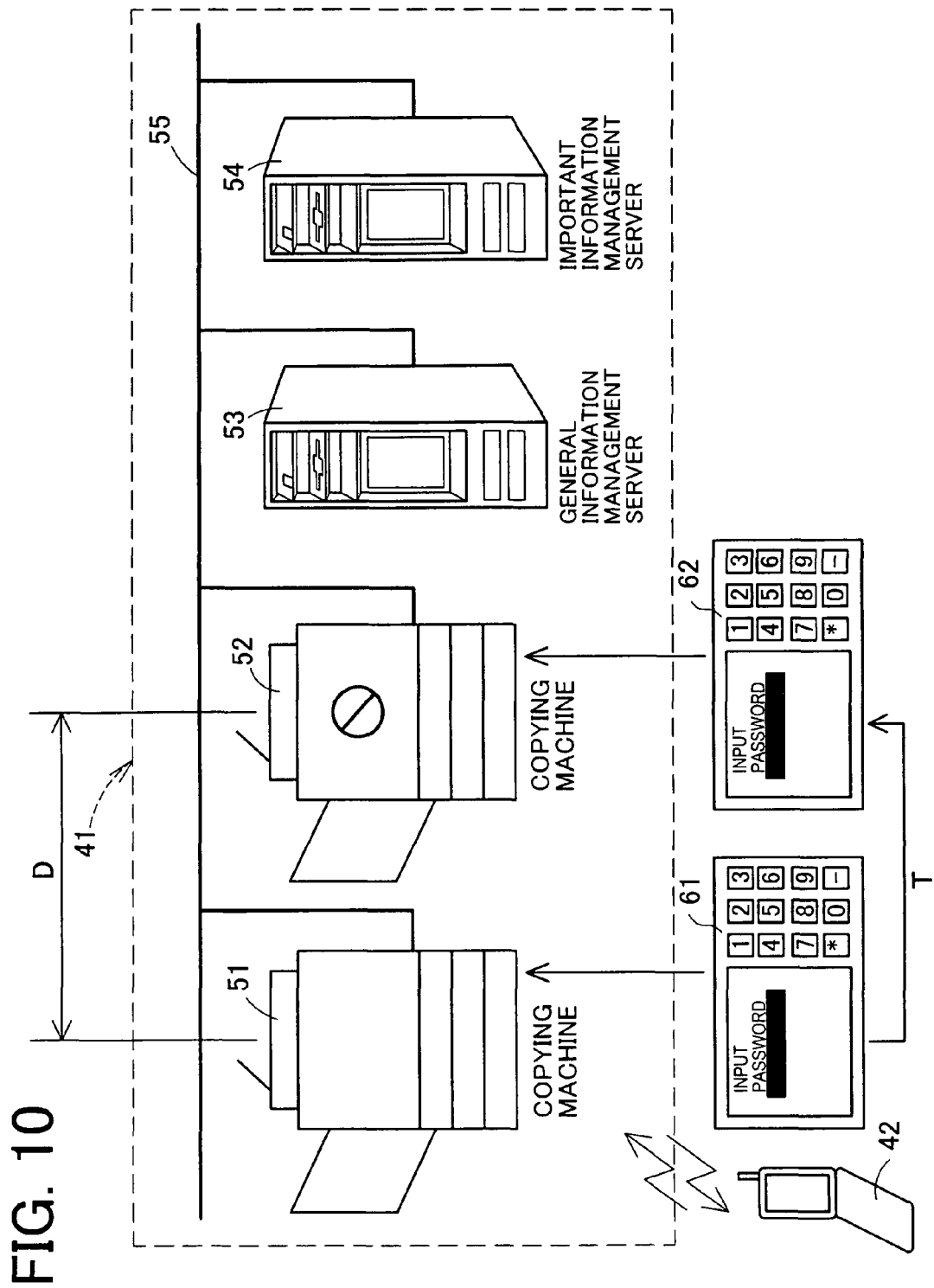
FIG. 10 is a diagram for illustrating an operation of a verification system.

FIG. 10 shows such a case. FIG. 10 indicates a case where after the time T is elapsed after the usage of the copying machine 51 by the double verified user is ended, the same password is inputted to the copying machine 52 located a distance D apart from the copying machine 51. Here, assume that the user of the copying machine 52 does not carry the portable instrument 42 and is verified as a single verified user. If it is determined that the user cannot move like a case where D=15 meter and T=1 second, usage of the copying machine 52 by the user is prohibited. The same thing can be said if the user of the copying machine 51 is a single verified user. If a verified user of the copying machine 52 is a double verified user and his identification code is different, the usage of the copying machine 52 is permitted.

Figure 11:
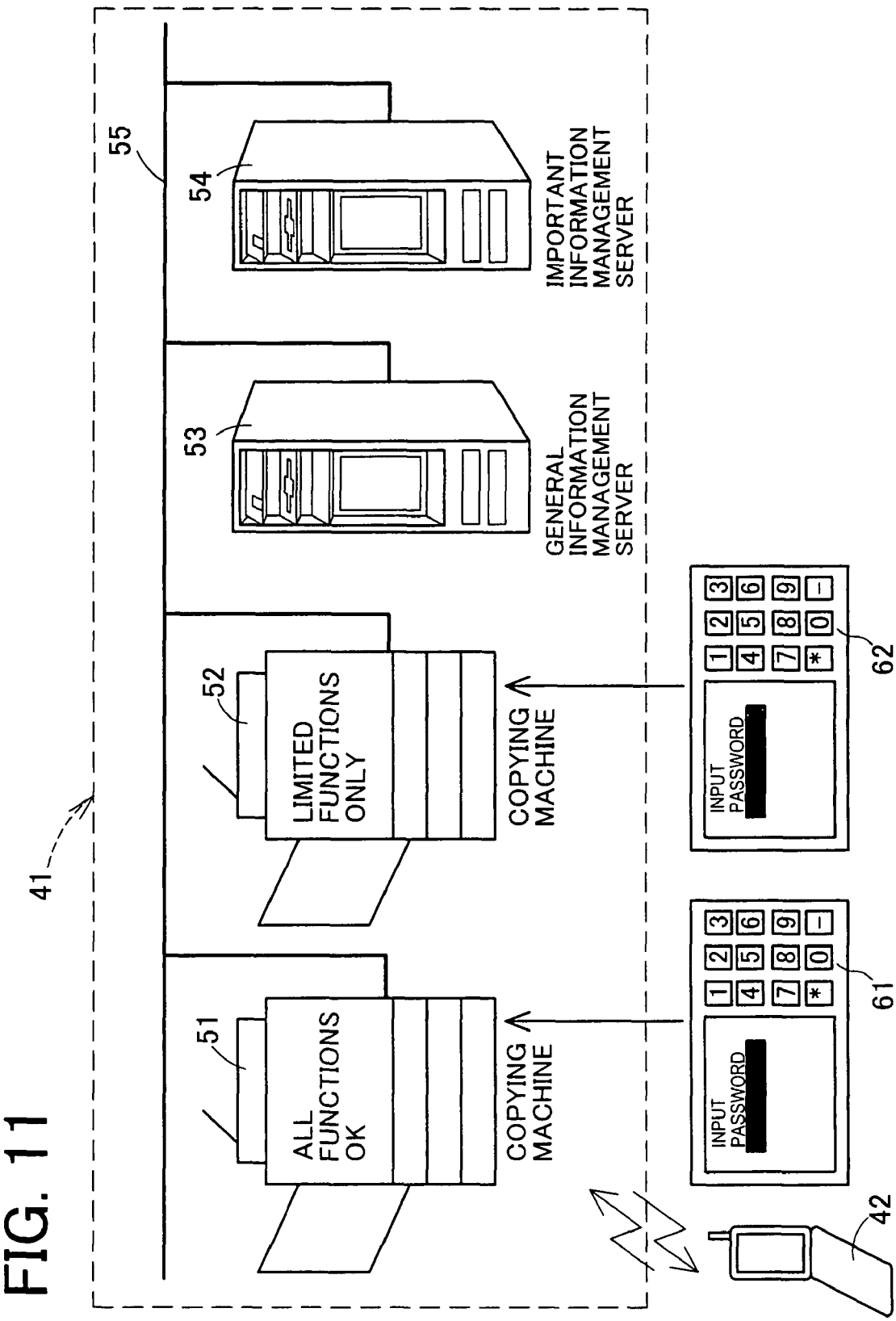
FIG. 11 is a diagram for illustrating an operation of a verification system.

In the description up to here, it has been stated that even the single verified user can use the respective copying machines 51, 52 without any restriction if his usage is permitted. However, the usage by the single verified user is limited to some extent. Hereinafter, this limitation will be described. If the respective copying machines 51, 52 receive an enable signal from the general information management server 53, usable function range is determined depending on which the user is a single verified user or a double verified user. If the user of the copying machine 51 is the double verified user in FIG. 11, all the functions of the copying machine 51 can be used. On the other hand, because the user of the copying machine 52 is the single verified user, verification level is low and usable function is limited. That is, the respective copying machines 51, 52 carry out an operation similar to an operation restricting means.

The functions of the respective copying machines 51, 52 include, for example, quantity of copies, output type, paper attribute, output resolution, number of output colors and the like. The output type refers to classification about single sided print or double sided print or classification about 1 in 1 print, 2 in 1 print and 4 in 1 print. The paper attribute refers to the type of print paper for use. The output resolution refers to classification of low, standard and high. The number of output colors refers to one color, four colors, full-color and the like. Of these functions, the functions which the single verified user can use are restricted to, for example, number of copies=only 1, output type=single sided print prohibition and 1 in 1 print prohibition, paper attribute=only reproduced paper, output resolution=only low resolution, and number of output colors=full-color prohibition. Of course, such a limitation is not applied to the double verified user and he can use every function. In the meantime, if the respective copying machines 51, 52 are provided with a finisher (paper folding, staple drive and the like), it is permissible to prohibit the single verified user from using that function.

Figure 12:
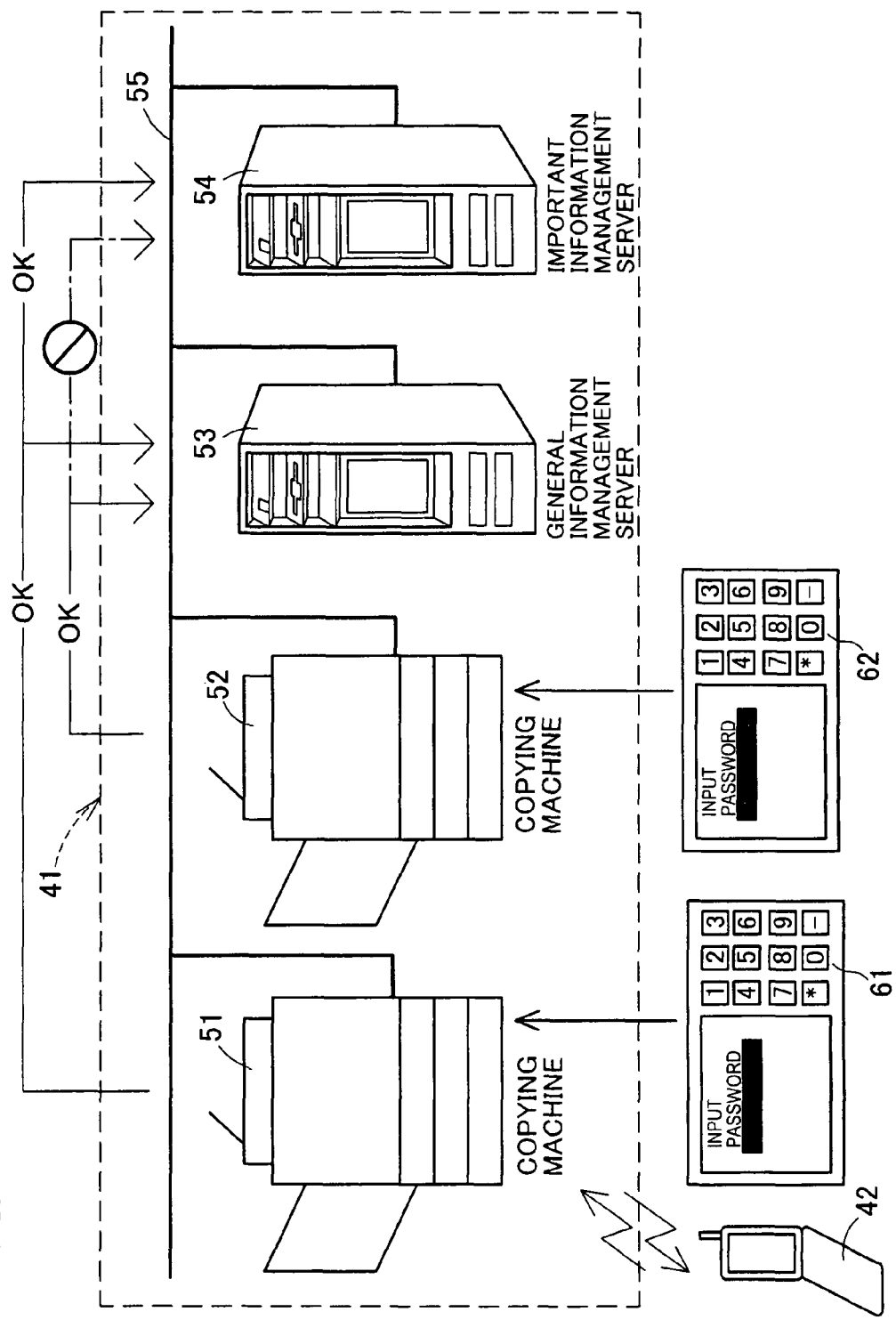
FIG. 12 is a diagram for illustrating an operation of a verification system.

FIG. 12 shows a case where the copying machines 51, 52 can read out information stored in the general information management server 53 or the important information management server 54 and print it. In this case, it is so limited that although the double verified user can access any one of the general information management server 53 and the important information management server 54, the single verified user cannot access but the general information management server 53. In case of FIG. 12, because the user of the copying machine 51 is the double verified user, he can access any one of the general information management server 53 and the important information management server 54. However, because the user of the copying machine 52 is the single verified user, access to the important information management server 54 by him is prohibited. These limitations may be carried out to the copying machines 51, 52 in the same ways or may be in different ways.

Figure 13:
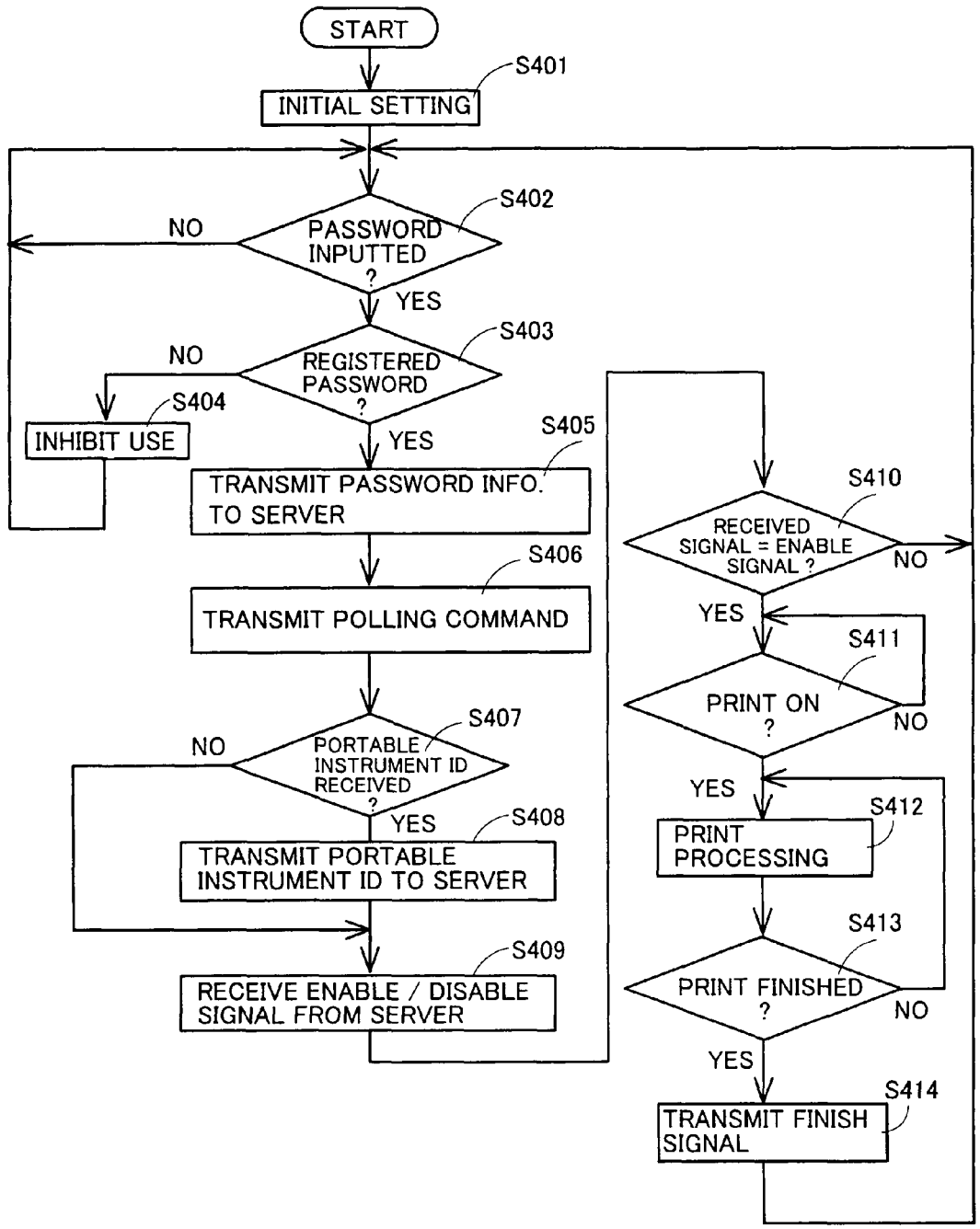
FIG. 13 is a flowchart showing an operation of each copying machine for a verification system.
Figure 14:
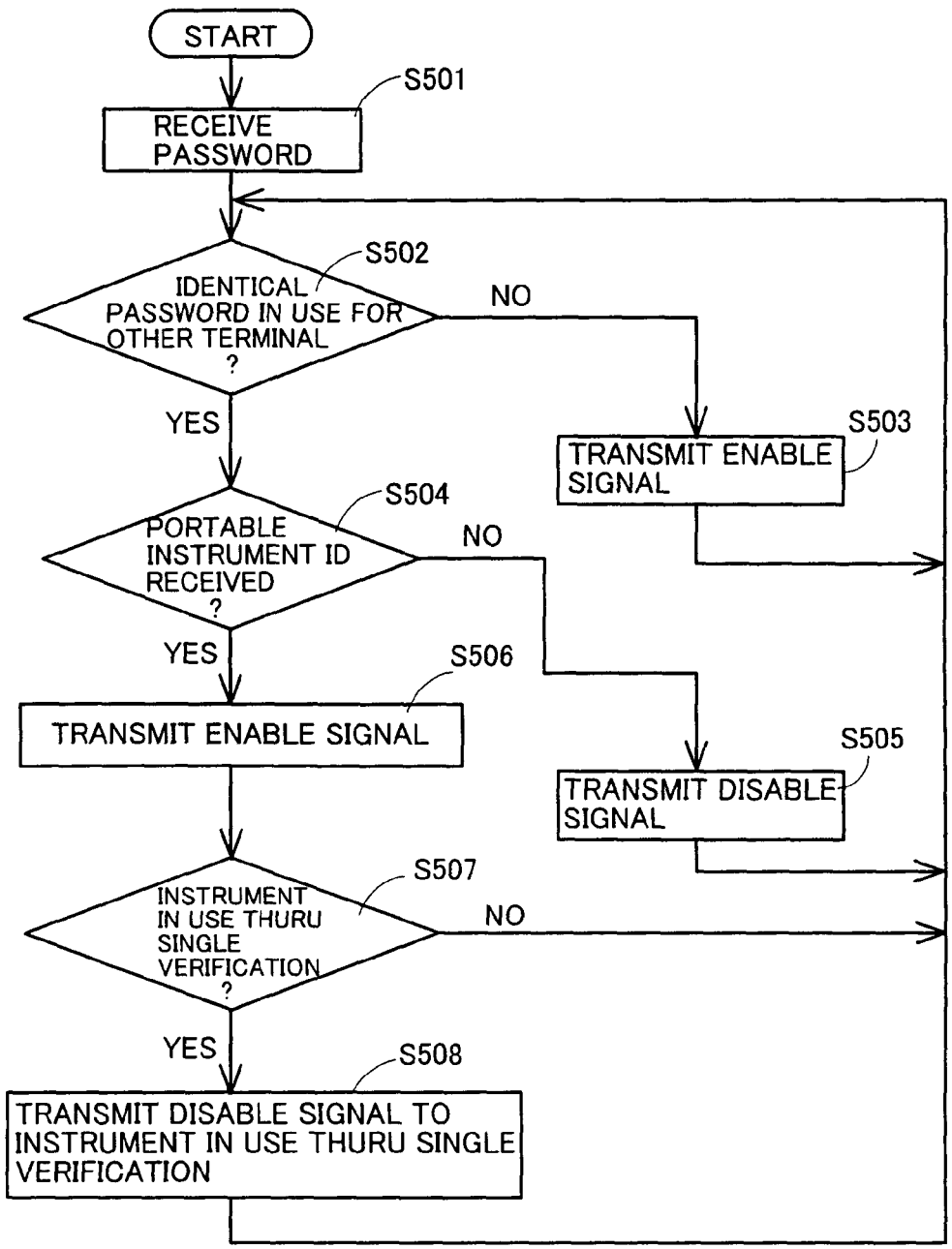
FIG. 14 is a flowchart showing an operation of a server for a verification system.
Figure 15:
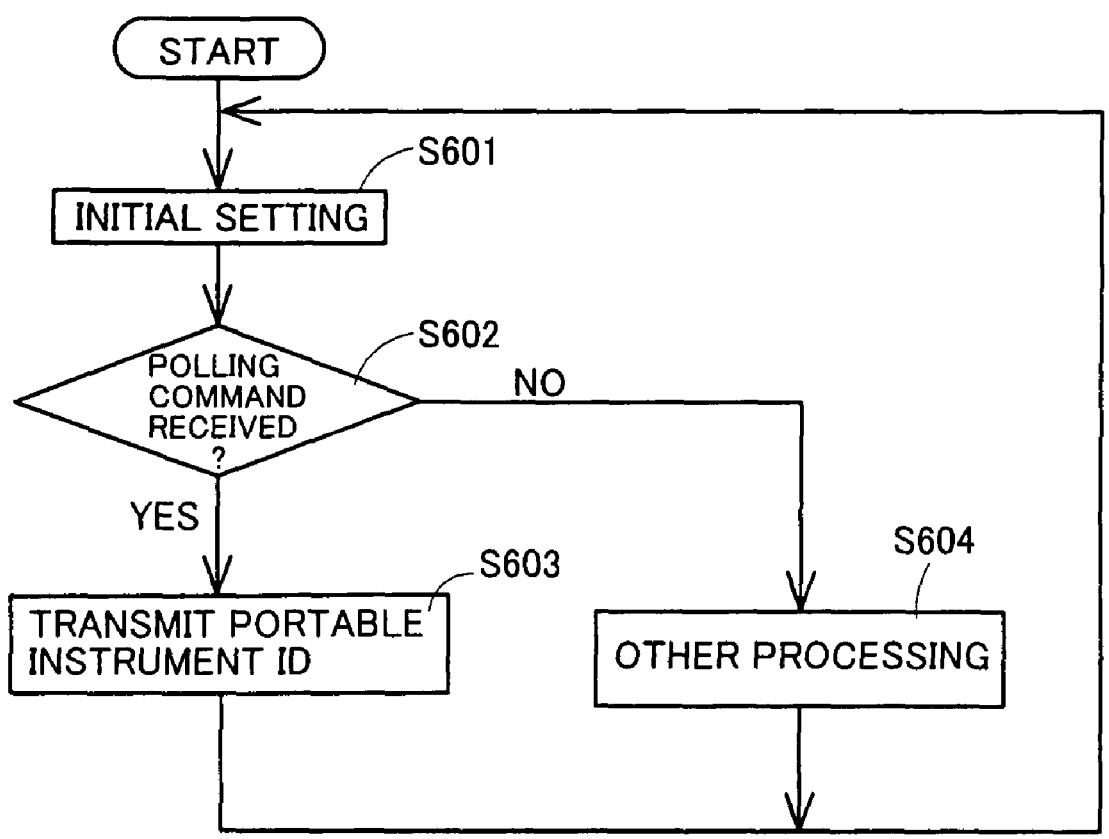
FIG. 15 is a flowchart showing an operation of a portable apparatus for a verification system.

Next, the operation of the verification system of this embodiment will be described with reference to the flow charts of FIGS. 13-15. FIG. 13 shows processing which are carried out in the copying machines 51, 52. FIG. 14 shows processing which is carried out in the server 53. FIG. 15 shows processing which is carried out in the portable instrument 42.

In the copying machines 51, 52, initial setting including copy mode and the like is carried out after the processing is started by turning on power (S401). Then, whether or not any password is inputted by user's operating the key switches 61, 62 is determined (S402). If no password is inputted (S402: No), the copying machines 51, 52 stand by with their initial setting condition (S401). If any password is inputted (S402: Yes), whether or not the inputted password is a registered password is determined (S403). If it is not a registered password (S403: No), the usage of that user is not permitted (S404). Then, the copying machines 51, 52 stand by with their initial setting (S401).

If the inputted password is a registered password (S403: Yes), that password information is transmitted to the server 53 (S405). The information transmitted here may be verification information relating to the password. Subsequently, the copying machines 51, 52 transmit a polling command in order to receive an identification code of the portable instrument 42 located in a range at a short distance (S406). With the transmitted polling command, whether or not an identification code of the portable instrument 42 is received is determined (S407). If the identification code of the portable instrument 42 is received (S407: Yes), that received identification code is transmitted to the server 53 (S408).

After receiving password information of user or the identification code of the portable instrument 42, the server 53 determines whether or not usage of the copying machines 51, 52 is permitted according to a flow chart shown in FIG. 14, which will be described later. According to a result of that determination, the server 53 transmits an enable/disable signal to the copying machines 51, 52 (S503, S505, S506 in FIG. 14). Then, the respective copying machines 51, 52 receive the enable/disable signal from the server 53 (S409). If a signal received at this time is a disable signal (S410: No), the copying machines 51, 52 are set up to be disabled and stand by with the initial setting condition (S401).

If the received signal is an enable signal (S410: Yes) in S410, the copying machine is set up to be enabled, so that it stands by until a print key is inputted (S411). If the print key is turned on (S411: Yes), print processing is executed (S412). The print processing is continued (S412) until the print processing is ended (S413: No). If the processing is ended (S413: Yes), a finish signal is transmitted to the server 53 (S414). With this transmitted finish signal, the server 53 determines that the copying machines 51, 52 are not being used. The end of this print processing may be executed by user's inputting a key. Alternatively, it is permissible to construct that the processing is ended if no key is inputted to the copying machines 51, 52 in a period over a predetermined time. If the finish signal is transmitted (S414), the copying machines 51, 52 stand by in their initial setting condition until a password is inputted again (S401).

Next, the operation of the server 53 will be described with reference to FIG. 14. The server 53 executes other processing until password information is transmitted from the copying machines 51, 52. Then, the server 53 receives the password information transmitted by the copying machines 51, 52 in S405 of FIG. 13 (S501). The server 53 determines whether or not there is any machine currently being employed after its verification based on the same password, of other machines connected to LAN than the machine which transmits the password information in S501 (S502). If there is no other machine being employed with the same password (S502: No), the server 53 transmits an enable signal to that machine (S503) and comes to stand by.

If there is any machine being employed with the same password (S502: Yes), whether or not an identification code of the portable instrument 42 is received from that machine is determined (S504). The identification code of this portable instrument 42 is transmitted in S408 of FIG. 13. If the identification code of the portable instrument 42 cannot be received here (S504: No), the user is a single verified user and the same password has been already used by other machine. Thus, the server 53 transmits a disable signal to that given machine (S505) and comes to stand by. If the identification code of the portable instrument 42 can be received (S504: Yes), the user is a double verified user and therefore, the server transmits an enable signal to that machine (S506). The disable signal or enable signal transmitted in S503, S505, S506 is received by that machine in S409 of FIG. 13.

If the server permits usage of that machine (S506), it is necessary to check whether or not user of other machine used with the same password is a proper user. Then, whether or not there is any other machine currently being used under single verification is determined (S507). If there is no machine used under single verification (S507: No), any user is recognized to be a proper user and therefore, the server 53 comes to stand by. Alternatively, if there is any machine currently used under the single verification (S507: Yes), there is a fear that that machine may be used improperly. Thus, a disable signal is transmitted to a machine being used under the single verification.

Next, the operation of the portable instrument 42 will be described with reference to FIG. 15. The portable instrument 42 executes various kinds of initial settings if the power is turned on and its usage is started (S601). Then, whether or not a polling command is received is determined (S602). If the polling command transmitted from the copying machines 51, 52 in S406 of FIG. 13 is received (S602: Yes), the portable instrument 42 sends back its inherent identification signal to the copying machines 51, 52 (S603) and comes to stand by. While it receives no polling command (S602: No), the portable instrument 42 executes processing of other function (S604) and stands by.

As described above, according to this embodiment if the passwords inputted by users verified by the copying machines 51, 52 are the same, any one of them can be improper verification. Thus, the general information management server 53 permits a double verified user by the password and the portable instrument 2 to use it and prohibits a single verified user by only the password from using it. Further, if after usage of the copying machine 51 is ended, the verification is carried out with the same password on the copying machine 52 at a time interval which does not allow the user to move from the one to the other, usage of the copying machine 52 is not allowed to a single verified user. Further, the single verified user is not allowed to use every available function and he cannot access the important information management server 54. Consequently, there is provided a verification system 41, which permits usage of the respective copying machines 51, 52 in an appropriate range depending on the security level of a verified system.

The present invention may be embodied in other specific forms without departing from the spirit or essential characteristics thereof. For instance, although the above-described embodiment adopts two verification methods possessed by the copying machines 51, 52, namely, by input of the password and identification code of the portable instrument 42, there may be a machine having only one verification method or a machine adopting three or more verification methods. Further there may be a machine having other verification methods such as by input of the card. In such a case, each of the respective verification methods is supplied with a level value which serves as an index of those security levels, so that a machine having a higher priority may be selected depending on its level value. Further, although according to the above-described embodiment, it is assumed that the copying machines 51, 52 possess the verification means, it is permissible to construct that the copying machines 51, 52 only fetch in verification information such as password while the verification processing is carried out by the general information management server 53. Further, although according to the above-described embodiment, it is assumed that the copying machines 51, 52 act as an operation restricting means, the operation restricting means may be achieved in the general information management server 53 so as to transmit an instruction signal to the respective copying machines 51, 52. Further, the identification code may be acquired by communication with a base station system such as the portable phone instead of or as well as the short-range radio communication. Further, a machine verified and used is not restricted to a copying machine.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated.

It is intended that the scope of the invention be defined by the claims appended hereto, and their equivalents.

What is claimed is:

1. A verification system comprising:
   a first image processing apparatus and a second image processing apparatus each of which contains verification sections based on two or more kinds of verification methods; and
   a permission restricting section that restricts an operation of the first image processing apparatus permitted based on a single verification result utilizing a first verification method or a second verification method when an operation permission for the second image processing apparatus is granted based on a double verification result utilizing both the first verification method and the second verification method,
   wherein the permission restricting section restricts an operation of the first image processing apparatus that has been permitted before the operation permission for the second image processing apparatus if the double verification result of the second image processing apparatus is drew by user verification content that is the same as user verification content utilized in the single verification result of the first image processing apparatus.

2. The verification system according to claim 1, wherein each of the first and second image processing apparatus comprises at least two of following operation items: a scanner that scans a document to obtain image data thereon; a printer that foams an image based on image data; and an image transmitting apparatus that transmits image data to other apparatus.

3. The verification system according to claim 1, wherein a verification result in accordance with the first verification method is executed by obtaining user identification information.

4. The verification system according to claim 1, wherein a verification result in accordance with the second verification method is executed by obtaining a user's positioning information from a portable instrument carried by the user.

5. The verification system according to claim 4, wherein the user's positioning information is obtained from the portable instrument without any input by the user and only if the user carries the portable instrument with its power on.

6. A verification system comprising:
   a first image processing apparatus and a second image processing apparatus each of which contains verification sections based on two or more kinds of verification methods; and
   a permission restricting section that restricts an operation of the first image processing apparatus permitted based on a single verification result utilizing a first verification method or a second verification method when an operation permission for the second image processing apparatus is granted based on a double verification result utilizing both the first verification method and the second verification method,
   wherein the permission restricting section restricts an operation of the first image processing apparatus that is permitted after the operation permission for the second image processing apparatus if the double verification result of the second image processing apparatus has been drew by user verification content that is the same as user verification content utilized in the single verification result of the first image processing apparatus.

7. The verification system according to claim 6, wherein a verification result in accordance with the first verification method is executed by obtaining user identification information.

8. The verification system according to claim 6, wherein a verification result in accordance with the second verification method is executed by obtaining a user's positioning information from a portable instrument carried by the user.

9. A verification system comprising:
- a first image processing apparatus and a second image processing apparatus each of which contains verification sections based on two or more kinds of verification methods; and
- a permission restricting section that restricts an operation of the first image processing apparatus permitted based on a single verification result utilizing a first verification method or a second verification method when an operation permission for the second image processing apparatus is granted based on a double verification utilizing both the first verification method and the second verification method, wherein, after an operation of the second image processing apparatus is finished, when the single verification result of the first image processing apparatus is drew by user verification content that is the same as user verification content utilized in the double verification result of the second image processing apparatus, the permission restricting section restricts or not of an operation of the first image processing apparatus depending on positioning information of the first and second image processing apparatuses and verification time information relating to the first image processing apparatus.

* * * * *